Nov. 25, 1924.                    W. J. LOURY                    1,516,862
                                FOOT PEDAL REST
                              Filed Oct. 18, 1923          4 Sheets-Sheet 1

WITNESSES

INVENTOR
William J. Loury
By Winter & Brown
his Attys.

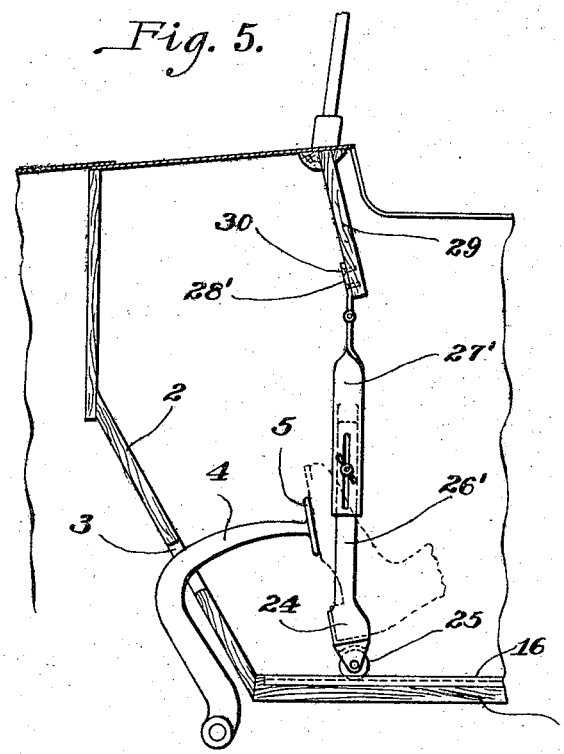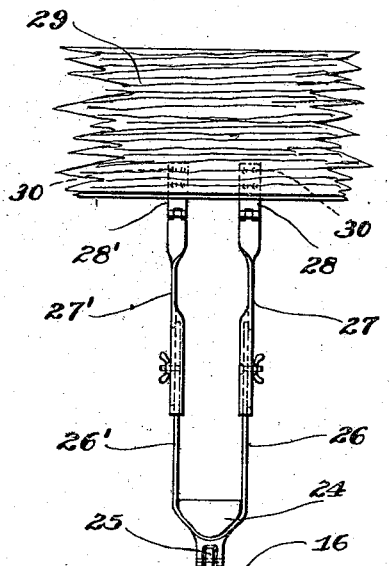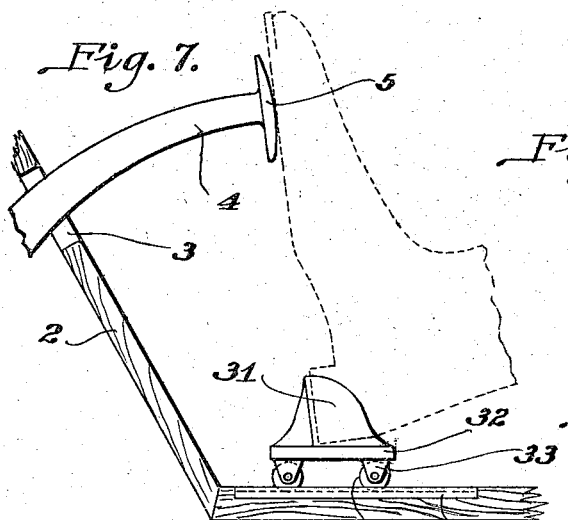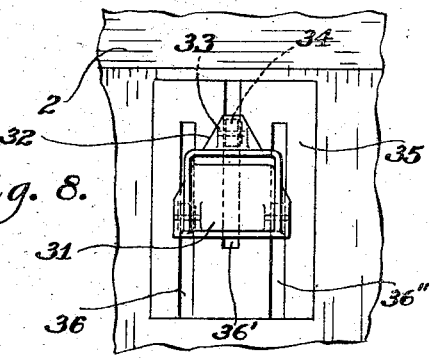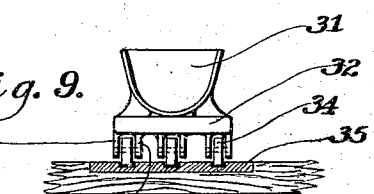

Nov. 25, 1924.
W. J. LOURY
1,516,862
FOOT PEDAL REST
Filed Oct. 18, 1923
4 Sheets-Sheet 3

WITNESSES
AB Wallace
CR Halbert

INVENTOR
William J. Loury
By Winter & Brown
His Attys.

Nov. 25, 1924.

W. J. LOURY

FOOT PEDAL REST

Filed Oct. 18, 1923

1,516,862

4 Sheets-Sheet 4

WITNESSES
A. B. Wallace.
C. R. Halbert.

INVENTOR
William J. Loury
By Winter & Brown
His Attys.

Patented Nov. 25, 1924.

1,516,862

UNITED STATES PATENT OFFICE.

WILLIAM J. LOURY, OF CHATTANOOGA, TENNESSEE.

FOOT-PEDAL REST.

Application filed October 18, 1923. Serial No. 669,272.

*To all whom it may concern:*

Be it known that I, WILLIAM J. LOURY, a citizen of the United States, and a resident of Chattanooga, in the county of Hamilton and State of Tennessee, have invented a new and useful Improvement in Foot-Pedal Rests, of which the following is a specification.

This invention relates to foot rests, and particularly to a foot rest for use in automobiles in connection with the several foot pedals.

It is an object of the invention to provide a foot rest for use in connection with the operating foot pedals which will effectively and conveniently support the weight of the foot and leg of the driver thereby rendering it less tiresome to drive, especially long distances, and which will at the same time function as a positive guide for maintaining the foot in the proper relative position for actuation of the pedals thus assuring a factor of safety.

It is a special object to provide a device of this character which will support the weight of the foot and leg at all times in such manner as to obviate the necessity of lifting the foot during actuation of the foot pedals.

Other special objects are to provide a foot pedal rest which may be easily applied to automobiles already in use, which will resiliently suspend the foot so as to eliminate undue vibration thereof, which will automatically adjust itself within predetermined limits in accordance to the size of the driver, which may be manually adjusted with ease to suit the needs of the driver, and which will while effectively acting as a guide for the pedal with which it is associated, at the same time permit sufficient lateral movement to enable the driver to manipulate auxiliary pedals such as the accelerator pedal without removing the foot from the rest.

These and other objects of the invention will more fully appear when taken in conjunction with the following description and the appended claims.

Figure 1:
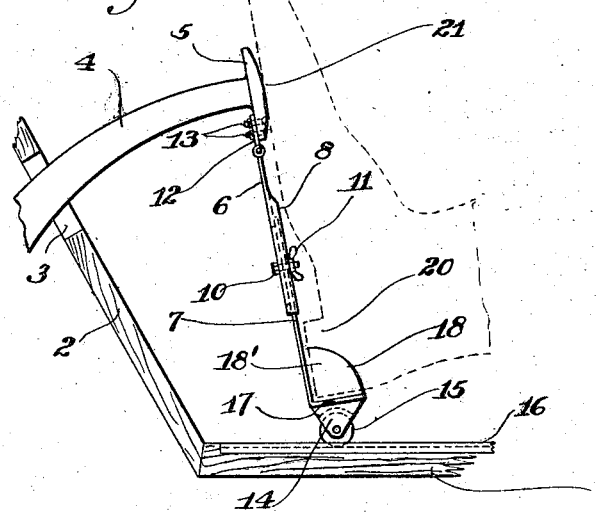
Figure 2:
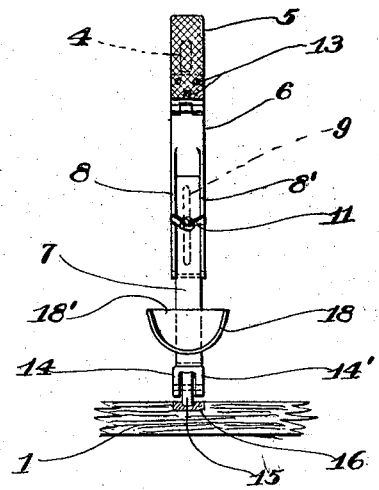
Figure 3:
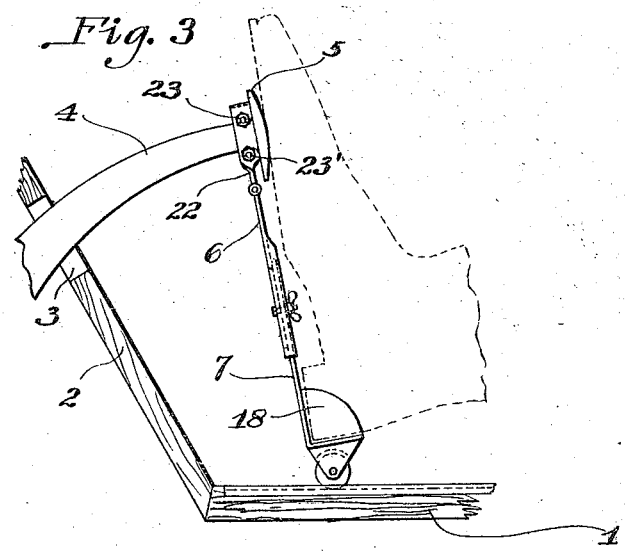
Figure 4:
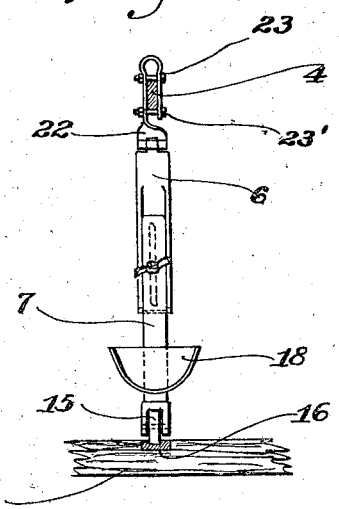
Figure 10:
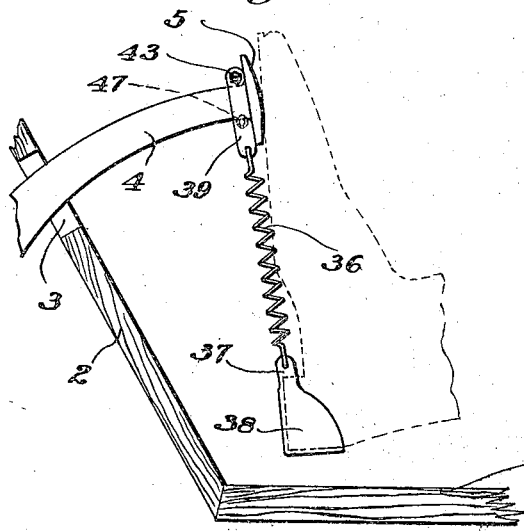
Figure 11:
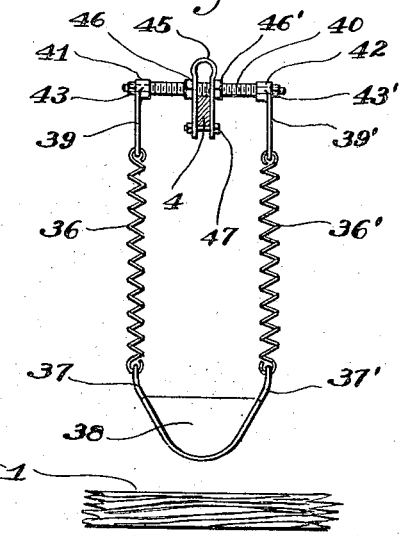
Figure 12:
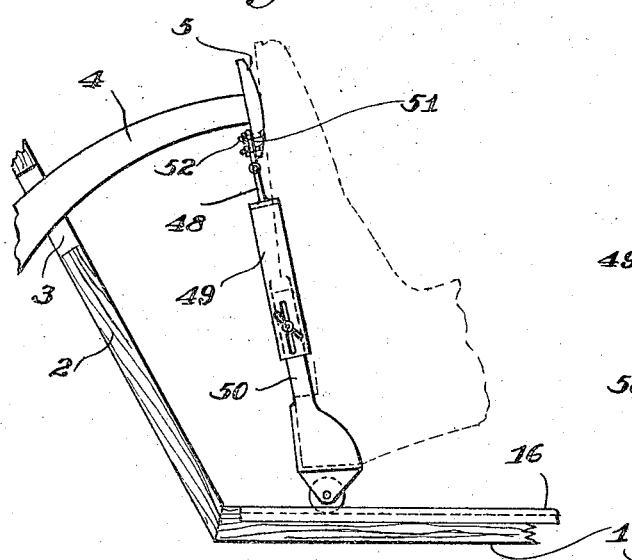
Figure 13:
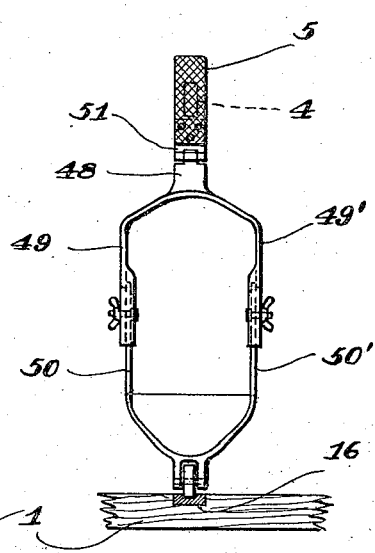
Figure 14:
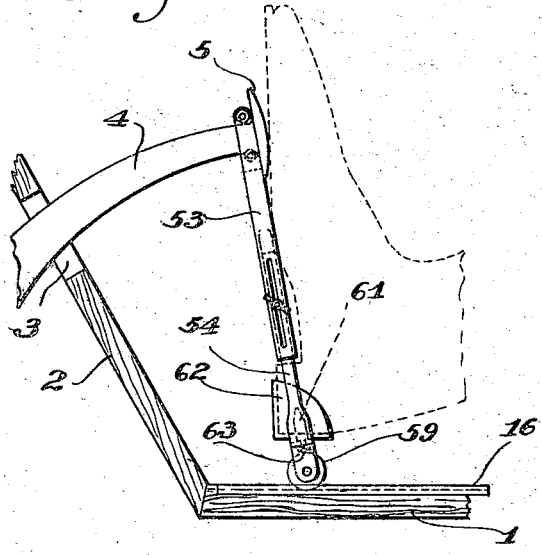
Figure 15:
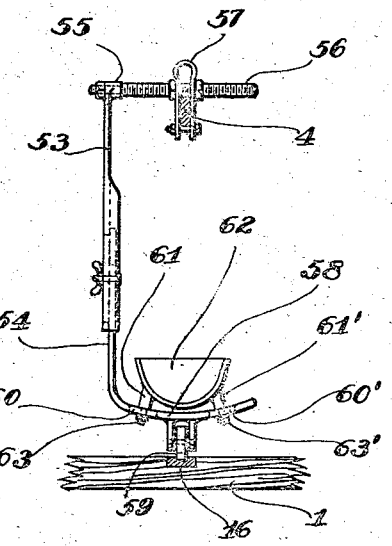

In the accompanying drawings, Fig. 1 is a side elevation illustrating one embodiment of the invention and the method of suspending the same from the pedal with which it is associated; Fig. 2 an elevation of the rest shown in Fig. 1 looking in a plane at right angles to that as viewed in Fig. 1; Fig. 3 another embodiment of the invention illustrating an alternative method of suspending the rest from the pedal; Fig. 4 a view similar to Fig. 2 of the parts illustrated in Fig. 3; Fig. 5 an elevational view of another embodiment of the invention showing the rest suspended from the dash of the automobile; Fig. 6 an elevation of the rest illustrated in Fig. 5 taken at right angles thereto; Fig. 7 a side elevation of a still further embodiment of the invention; Figs. 8 and 9, a plan and front elevation, respectively, of the form of rest shown in Fig. 7; Figs. 10 and 11, a side and a front elevation, respectively, of another modified form of the invention; Figs. 12 and 13, views corresponding to Figs. 10 and 11 of a still further modified form; Figs. 14 and 15 side and front elevational views of a form of the invention in which the suspending links or side bars are directly pivoted to a threaded bolt attached to the foot pedal, and Figs. 16 and 17 views corresponding to Figs. 14 and 15 of a modified form of the invention pivotally suspended from the pedal in a similar way, and in which a pair of heel plates are employed.

In the drawings, the horizontal portion of the floor of the automobile is indicated at 1 and the usual inclined portion thereof underlying the dash at 2. The portion 2 is provided with the opening 3 through which projects the upper end of the actuating foot pedal 4 having the enlarged head or terminal 5 adapted to be contacted by the foot of the operator in a well known manner. This pedal may be either the actuating pedal for the clutch, for the foot control service brake, or for any other similar purpose, the present invention relating to the particular construction of the rest regardless of the structure or use of the pedal with which it is associated. The parts just described have been illustrated in a number of figures of the drawings in connection with modified embodiments of the invention, but are designated by the same reference numerals throughout the specification.

The foot rest proper, as illustrated in Figs. 1 and 2, comprises a two-part extensible link, the upper part thereof being indicated at 6 and the lower part thereof at 7. The part 6 is equipped with marginal guiding flanges 8, 8', on its front face between which lies the upper end of the part 7. An elongated slot 9 is provided in the part 6 substantially midway between the guide flanges which cooperates with a bolt 10 extending through an aperture in the part 7, so as to render the link consisting of the parts 6 and 7 extensible for the purpose of changing its length in order to suit various drivers. The mode of adjusting these parts will be obvious from the above description and an inspection of the drawings, the parts being held in fixed relation after adjustment by means of the wing nut 11. A hinge plate 12 is pivotally connected to the upper extremity of the part 6 forming a fastening means for attaching the rest to the head 5 of the pedal, the plate 12 and the head being provided with apertures cooperating with the bolts indicated at 13 for this purpose. The lower extremity of the part 7 is equipped with a pair of spaced depending lugs 14, 14' between which is rotatably mounted an anti-friction device in the form of a roller 15. This roller is adapted to fit within a groove formed in a track 16 fixed to the floor 1, the upper surface of the track preferably lying flush with the upper surface of the floor, as clearly indicated in Fig. 2. Fixed in any desirable manner to the lower portion of the member 7, and preferably superposed upon a shoulder 17 overlying the lugs 14, 14', is a heel plate 18. This heel plate is provided with a concaved upper surface, conforming to the general contour of the heel of a shoe and has a bottom 18' for conveniently anchoring the plate to the member 7. The heel plate 18, during the use of the device, is adapted to cooperate with the heel 20 of the driver, in the manner illustrated by the dotted lines in Fig. 1 of the drawings, the length of the link being adjusted so as to bring the ball 21 of the foot into contact with the head 5.

In Figs. 3 and 4, an embodiment of the invention similar to that of Figs. 1 and 2 has been illustrated, the entire construction of the main portions of the rest being identical with the exception of the means for fastening or suspending the rest to the pedal. In this embodiment, instead of employing a hinge plate such as shown at 12, a curved plate 22 is hinged to the part 6, the upper extremity of the plate 22 being of inverted U-shape so as to straddle the pedal 4, the opposite limbs of this inverted U-shaped part being bound into intimate contact with the pedal by means of the bolts 23, 23'. The use of a fastening means in the form of a clamp such as illustrated in these figures, obviates the necessity of drilling apertures through the head 5. Parts common to the two embodiments just described have been designated by the same reference numerals.

In Figs. 5 and 6 the heel plate 24 is provided with an anti-friction roller 25 similar to the roller 15, and is equipped with the upwardly extending side bars 26, 26', forming the lower portions of a pair of extensible links. Cooperating with the bar 26 and adjustable with respect thereto in a manner similar to that described in connection with the embodiments illustrated in Figs. 1 to 4, is a member 27 forming the upper part of one of the extensible links. Likewise, cooperating with the bar 26' is a member 27'. Pivotally attached to the upper ends of the members 27 and 27' are the hinge plates 28, 28', respectively, which are attached to the depending portion 29 of the dash in any suitable manner as by the screws 30. The roller 25 cooperates with the groove in the track 16 as in the previously described forms.

In the modification shown in Figs. 7 to 9, the heel plate 31 is formed on or attached to a carriage or block 32 equipped with spaced apart pairs of depending lugs such as indicated at 33, 33'. Preferably three pairs of such depending lugs are provided, a roller 34 being mounted in each pair. In this instance the track 35, corresponding to the track 16, is provided with three grooves indicated at 36, 36' and 36", respectively.

In Figs. 10 and 11, a modified form of the invention is shown in which the side links of the rest consist of extensible coiled springs 36, 36', the lower ends of these springs being pivotally connected to ears 37, 37' extending from the upper portion of the heel plate 38. The upper extremities of the springs 36, 36', are likewise pivotally connected to a pair of spaced apart lugs 39, 39', pivotally mounted at the opposite ends of a threaded bolt 40. In order to pivotally mount the lugs on the bolt, the outer extremities thereof are reduced in diameter so as to provide a bearing such as indicated at 41 upon which is journaled the apertured boss 42 formed on the lugs. The lugs 39 and 39' are retained in place by means of the nuts 43, 43'. This form of rest is suspended from the pedal by means of an inverted U-shaped clamp 45 the opposite limbs of which are provided with aligned apertures through which the bolt 40 extends, and nuts 46, 46', lie adjacent these limbs so as to not only permit shifting of the clamp to various positions along the bolt 40 but to bind the limbs into contact with the pedal 4, and additional clamping bolt being provided for the lower extremities of the limbs as indicated at 47. In this modification, it has been found desirable not to equip the bottom of the heel plate with an anti-friction roller for a purpose to be presently described. It is noted, however, that such a guiding roller may be employed should it be found to be desirable.

The form of the invention illustrated in Figs. 12 and 13 corresponds generally to that illustrated in Figs. 5 and 6, with the exception of the formation of the upper link portions and their manner of suspension. Instead of providing two separate link portions, corresponding to the members 27, 27', a single Y-shaped member 48 is employed, the depending limbs 49, 49' of which are adjustably connected to the upstanding side bars 50, 50'. The upper extremity of the member 48 has pivotally attached thereto the hinge plate 51 which is bolted to the rear of the pedal head 5 as shown at 52.

In the modification illustrated in Figs. 14 and 15, a single link comprising the upper part 53 and the lower part 54 is employed, the said parts being slidingly connected as in several of the previously described forms. The upper link member 53 is equipped with the apertured boss 55 which is pivotally mounted upon the reduced end of a threaded bolt 56, similar to the bolt 40. The bolt 56 is also equipped with an inverted U-shaped clamp 57 for suspending the parts from the pedal 4. The lower extremity of the link member 54 is projected laterally as indicated at 58, this lateral extension being provided on its under-surface with depending lugs for mounting an anti-friction roller 59. The extension 58 is also provided with a pair of spaced apart elongated slots 60, 60', for cooperating with reduced portions of fingers 61, 61', projecting downwardly from the heel plate 62, these fingers projecting through the said slots and provided at their outer extremities with locking nuts 63, 63'. The provision of the fingers 61, 61' and the elongated slots 60, 60', enables the heel plate 62 to be adjusted to various positions along the extension 58, in an obvious manner.

Figure 16:
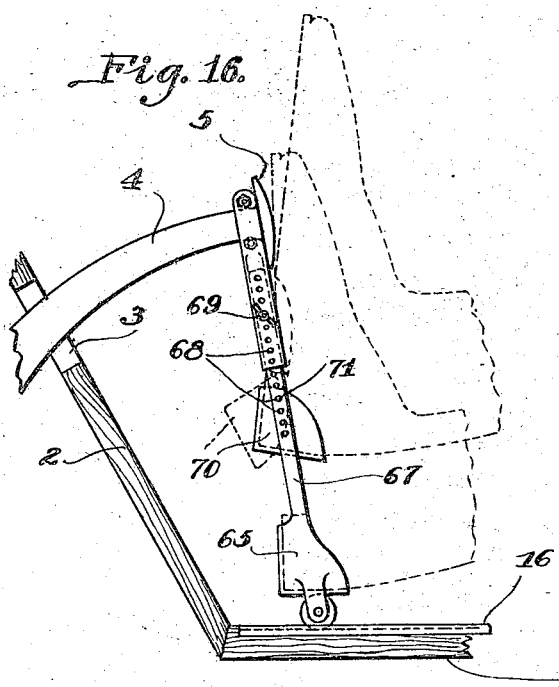
Figure 17:
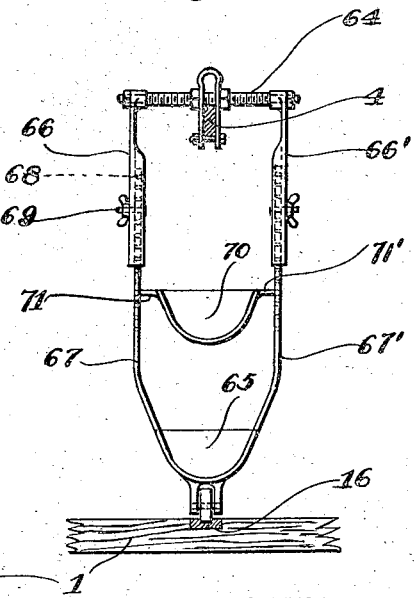

The embodiment illustrated in Figs. 16 and 17, corresponds generally to that shown in Figs. 14 and 15, with the exception that a pair of extensible links are suspended from the opposite ends of the bolt 64 corresponding to the bolt 56, and the heel plate 65 is formed integrally with the lower portions of the link members. The upper link members are designated at 66, 66', and the lower link members as 67, 67', respectively. Instead of providing an elongated slot through one of the link members in order to afford means for lengthening the links, a plurality of spaced apart apertures such as indicated at 68 is employed, the lengths of the links being adjusted by inserting the clamping bolt 69 through an appropriate aperture 68. A second heel plate 70 is employed in this embodiment, which may be inserted or removed at will. The object of the second heel plate 70 is two-fold. First, it enables the rest to be employed by persons of small size, due to the fact that the plate 70 may be adjusted to various heights, irrespective of the lengths of the links, and second, the plate 70 affords a pivotal support for the driver's heel which is not secured by means of a plate such as 65 integrally or rigidly attached to the links. The general form of the plate 70 corresponds to those previously described, being equipped at opposite sides thereof with fingers in the nature of trunnions 71, 71', which are adapted to project through the openings 68 in the members 67 and 67'. In order to adjust the height of the plate 70, it is merely necessary to disconnect the lower members 67, 67' from the upper link members 66, 66', so as to remove the lower half of the rest. With the lower half of the rest removed from the link members 66, 66', the members 67 and 67' may be sprung apart due to the resiliency of the material from which they are made, thereby enabling the fingers 71, 71' to be shifted to any desired pair of aligned openings 68. After the fingers have been inserted in this manner, release of the members 67, 67', permits them to assume the relative positions indicated in Fig. 17, thus pivotally supporting the heel plate 70 in operative condition.

The manner of using the various forms of rests described, will be obvious from the foregoing description, and from the illustrations in the drawings. In all of the forms, with the exception of those illustrated in Figs. 7 to 11, the length of the link or links is adjusted so as to bring the ball of the foot in contact with the head 5 of the pedal when the heel of the foot is positioned within the heel plate, as clearly indicated by the dotted lines in the several figures. With the parts thus positioned, the weight of the foot and leg of the driver is supported, and the pedal may be operated in an obvious fashion by merely pushing forward upon the head 5. During movement of the pedal, the several parts accommodate themselves due to the pivotal suspension of the links and the movement of the roller within the groove in the trackway fixed to the floor 1.

The mode of operation of the rest is similar, whether the rest is suspended from the head of the pedal or from the dash extension 29, as illustrated in Figs. 5 and 6.

With the form shown in Figs. 7 to 9, the movable carriage or block 32 merely runs forwardly or backwardly permitting the pedal to be actuated while effectively supporting the weight of the foot and leg of the driver in an obvious manner, the rest being positioned by means of engagement of the supporting rollers 34 with the grooves in the trackway 35.

The embodiment illustrated in Figs. 10 and 11 automatically adjusts the lengths of the links in accordance with the size of the driver. When the heel of the driver is placed within the plate 38, it is obvious that the springs 36, 36' are extended, the degree of extension depending upon the weight placed upon the plate 38. It is obvious that the larger and heavier the driver happens to be, the more the springs 36 and 36' will be extended during use, and by properly proportioning the several parts a substantial compensation in accordance with the size of the driver may be secured. It is also noted that with this form, the plate 38 may be readily swung laterally under the influence of the driver so as to bring the foot into alingnment with auxiliary pedals placed at the side of the pedal 4. This has been found convenient in actuating the accelerator pedal which is customarily placed slightly to the right of the usual brake pedal. It is thus seen that by using this form of the invention in conjunction with the brake pedal, the right foot of the driver will not only be effectively and conveniently supported for actuation of the brake pedal itself, but will permit the right foot of the driver to be swung sufficiently to one side without removing the heel from the plate 38 to enable him to actuate the accelerator pedal common to most automobiles now upon the market. It is noted, however, that an anti-friction roller operating in conjunction with a track-way may be employed, and in order to avoid marring the heel of the driver's shoe, the parts of the heel plates contacted thereby may be covered with any soft material or lining.

It is thus seen that the invention provides a very simple, compact, convenient, and effective foot rest for supporting the weight of the driver's foot and leg, which may be either suspended from the foot pedal itself or from the dash of the machine, which not only supports the foot of the driver, but acts as a positive guide to position the foot in the most desirable relation to the pedal head, which may be either applied to automobiles already in use or furnished as a part of their initial equipment, which may be easily adjusted to accommodate drivers of varying size, and which while normally positioning the foot with relation to the pedal with which the rest is directly associated at the same time allows sufficient lateral movement under the influence of the driver to permit actuation of auxiliary pedals disposed adjacent the main pedal.

I claim:

1. A foot pedal rest comprising a heel plate, and flexible extensible means connected to the heel plate for suspending the same.

2. A foot pedal rest comprising a heel plate, a supporting link connected to the said plate, and a fastening means pivotally attached to the end of the link.

3. A foot pedal rest comprising a heel plate, an extensible supporting link connected to the said plate, and a fastening means pivoted to the outer end of the link.

4. A foot pedal rest comprising a spring, a heel plate fixed to one end of the spring, and fastening means attached to the other end of the spring.

5. A foot pedal rest comprising a flexible, extensible spring, a heel plate attached to one end of the spring, and a fastening means pivotally attached to the opposite end of the spring.

6. A foot pedal rest comprising a fastening means adapted to be anchored to a foot pedal, a pair of spaced coiled extension springs pivotally attached to and suspended from the said fastening means, and a heel plate attached to the lower extremities of the said springs.

In testimony whereof, I sign my name.

WILLIAM J. LOURY.